United States Patent [19]

Rapp et al.

[11] 4,035,946

[45] July 19, 1977

[54] TRAP FOR SLUGS AND SNAILS

[76] Inventors: Wallace Thomas Rapp, 402 W. St. Gertrude Place, Santa Ana, Calif. 92707; Wallace A. Rapp; Gertrude A. Rapp, both of 803 W. 10th St., Santa Ana, Calif. 92701

[21] Appl. No.: 699,217

[22] Filed: June 24, 1976

Related U.S. Application Data

[63] Continuation-in-part of Ser. No. 634,867, Nov. 24, 1975, abandoned.

[51] Int. Cl.² .......................................... A01M 25/00
[52] U.S. Cl. ........................................ 43/131; 43/60
[58] Field of Search ................................ 43/131, 60

[56] References Cited

U.S. PATENT DOCUMENTS

| | | | |
|---|---|---|---|
| 1,314,112 | 8/1919 | Alderman et al. | 43/131 |
| 3,550,308 | 12/1970 | Ibach | 43/131 X |
| 3,772,820 | 11/1973 | Bond | 43/131 |
| 3,872,619 | 3/1975 | McIlwain | 43/60 |

Primary Examiner—Louis G. Mancene
Assistant Examiner—Daniel J. Leach
Attorney, Agent, or Firm—Gausewitz, Carr & Rothenberg

[57] ABSTRACT

An inner container is loosely mounted in an outer container so that it will float on water that may collect in the outer container. A cover mounted on and spaced above the outer container sheds rain water and provides an access for snails and slugs over the upper edges of both containers to poisoned bait positioned in the bottom of the inner container. The outer container is partly buried below the ground and should the ground become flooded so that water runs through the pest entries, the upper lip of the inner container blocks the flow of water to the inner container which will then float upwardly within the outer container and thus keep the poison bait from becoming water soaked or flowing outwardly to the ground.

18 Claims, 3 Drawing Figures

TRAP FOR SLUGS AND SNAILS

This application is a Continuation-In-Part of application Ser. No. 634,867, now abandoned, filed Nov. 24, 1975.

BACKGROUND OF THE INVENTION

The present invention relates to traps and more particularly concerns pest traps baited with poison that is desirably confined within the trap.

Poison bait, quite often merely spread upon the surface of the ground, is a common and effective means of control of pests such as snails and slugs. A major problem with this method of pest conrol, however, is the ready accessibility of this bait to children and pets. In attempted solutions of this problem, pest traps have been devised in which a container is provided for the bait, the container generally being covered to limit access except to the selected pests. Nevertheless, since such baited traps must have one or more entries substantially at or near ground level, the traps often are at least partially buried below the surface of the ground. Therefore, although rain water may be effectively shed by a suitable cover, running water on the ground surface due to heavy rains or flooding of the surface with a garden sprinkler or hose will cause water to enter the trap in quantity. If the trap should become filled with water to the level of the pest entry, the poison bait, now soaked with water, may disintegrate and float upwardly and out of the trap where it is distributed by the running water over the ground surface, thereby effectively negating the primary advantage of the trap.

Accordingly, it is an object of the present invention to provide a pest trap that eliminates or minimizes the above-mentioned problems and disadvantages.

SUMMARY OF THE INVENTION

In carrying out principles of the present invention in accordance with a preferred embodiment thereof, a container having a bottom and side walls is provided with means on upper edges of the side walls for defining an entry to its interior and means is provided responsive to water in the trap for blocking the entry so as to block flow of water into the container and to block movement of bait from the container. More specifically, water is blocked by use of an outer container circumscribing the bait container wherein the outer container has side walls with upper edges positioned below the upper edges of the inner container and the latter is provided with a positive buoyancy so that it floats upon water confined within the outer container.

DETAILED DESCRIPTION

Figure 1:
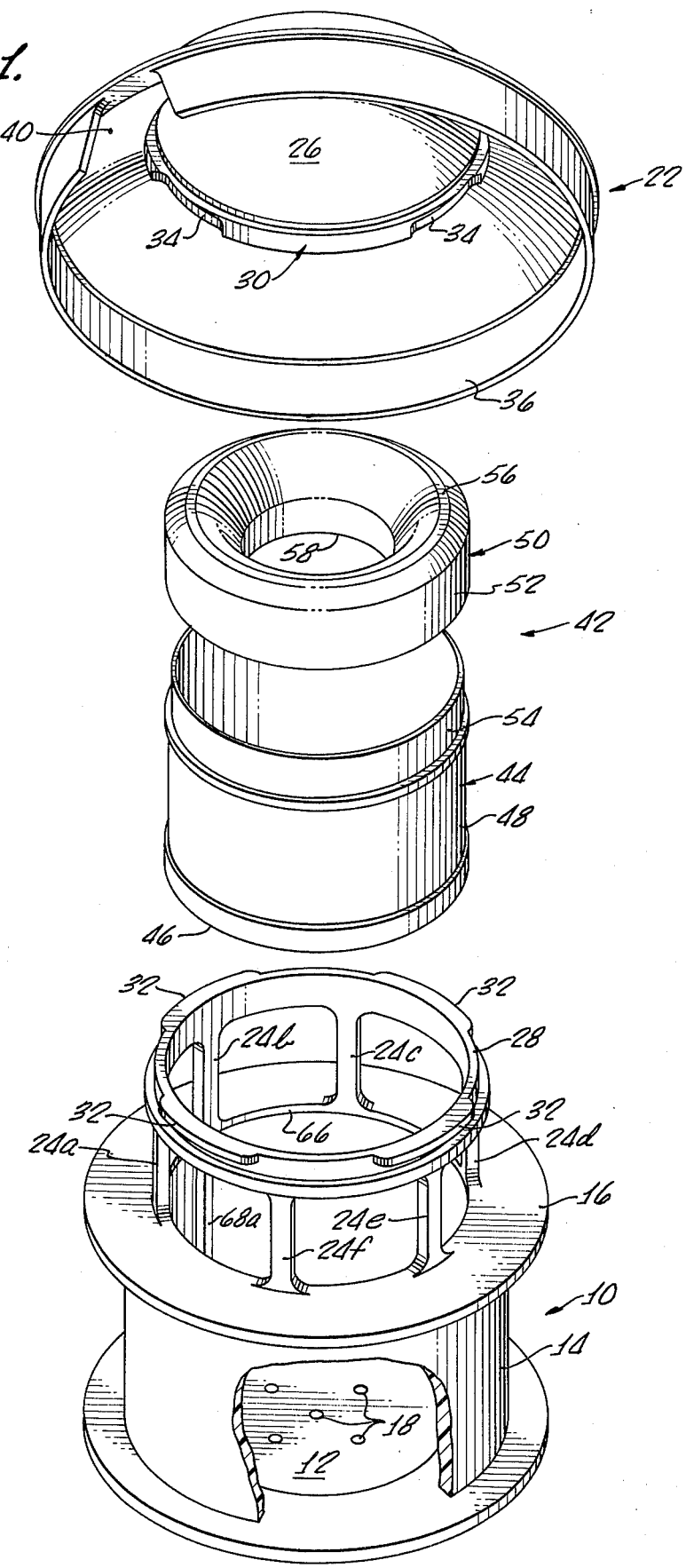
FIG. 1 is an exploded perspective view, with parts broken away, showing a preferred form of a trap embodying principles of the present invention.

An outer container 10 having a bottom 12 and an upstanding side wall 14, has an enlarged peripheral flange 16 formed at upper edges of the side wall. The container bottom 12 has a number of drainage apertures 18 formed therein and the container is preferably placed in the ground, partially buried, so that the flange 16 is substantially at or slightly above the ground surface, indicated at 20.

The container 10 may have any desired closed cross-sectional configuration whether polygonal or curved. However, a right circular cylindrical configuration is preferred and disclosed herein.

A dome shaped cover 22 is detachably mounted upon and spaced above the upper edges of the outer container 10.

A plurality of circumferentially spaced posts 24a through 24f are fixed at their lower ends to the flange 16 of the container 16 and at their upper ends to a common cover connecting ring 28. Although six posts are shown and presently preferred, it will be readily appreciated that greater or fewer numbers of such posts may be employed. The cover 22 includes a body portion 26 of dome shape or otherwise shaped to shed water and formed with an integral or otherwise fixed shoulder 30 on its inner surface. Shoulder 30 is preferably of circular configuration and cooperates with the support ring 28 to detachably secure the cover to the container 10. Conveniently, the shoulder 30 and ring 28 may be formed with interengaging threads or camming elements so that the cover may be readily secured to and detached from the support ring 28 by a simple motion such as partial rotation or rotation through several complete turns. As illustrated in the drawings, it is presently preferred to form the ring 28 with a plurality of circumferentially spaced radially outwardly projecting lands 32 for interlocking cooperation with a plurality of radially inwardly facing and circumferentially spaced lands 34 formed in the cover shoulder 30.

The cover includes a peripheral flange 36 that extends downwardly from the cover to a level substantially at or slightly above the level of flange 16 at the upper edge of outer container 10. Flange 36 thus nearly closes the container by having its lower edge in close proximity to the ground surface 20. The flange 36 is formed with one or more pest entries 40 in the form of apertures or discontinuities in the flange.

Loosely mounted within the outer container 10 is a buoyant inner container 42. Although the inner container 42 may be formed in many different arrangements as will be readily appreciated by those skilled in the art, it is preferred at present to form it of a lower section 44 having a bottom 46 and side walls 48. An upper section 50 includes side walls 52 that are snug sliding fit upon radially inwardly offset upper portions 54 of the lower section side wall 48. The two sections may be fixedly secured to each other as by adhesive or other securing means as deemed necessary or desirable to provide a unitary inner container having a smooth outer side wall.

Figure 2:
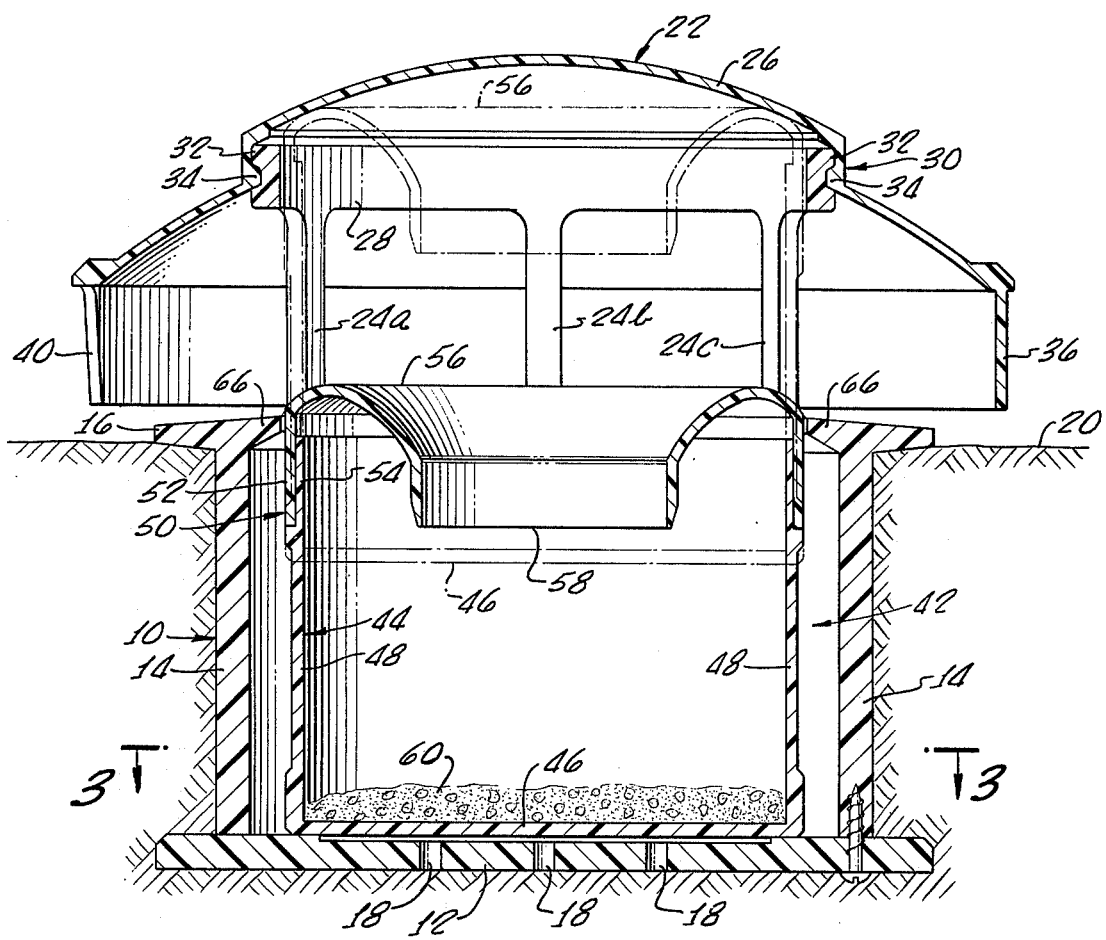
FIG. 2 is a vertical sectional view of the trap of FIG. 1 showing the inner container in an upper position in dotted lines.
Figure 3:
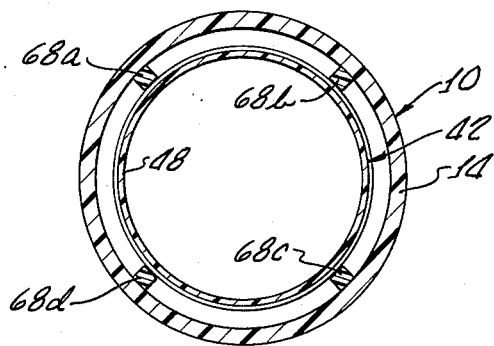
FIG. 3 is a horizontal section, of decreased size, taken on lines 3—3 of FIG. 2.

The upper edge of the container side wall 52 is formed with a circumferentially extending lip 56 extending completely around the upper edge of the inner container, extending radially inwardly and then curving downwardly as best shown in FIG. 2. This provides a radially inwardly spaced edge 58 which forms an obstacle to exit of a pest from the container. Outer container flange 16 includes an inwardly projecting peripheral shoulder 66. A plurality of circumferentially spaced guide bars 68a, 68b, 68c and 68d are fixed to the inner surface of the outer container to cooperate with shoulder 66 to define a circular cylindrical guide for the vertical gliding motion of the inner container.

The bottom and side walls of inner container 42 are completely closed and impervious to water so that the container, which is open at its top, has positive buoyancy. The inner container has an outer diameter less than the inner diameter of the ring 28 and less than the inner diameter of the outer container 10. With the inner container resting upon the bottom of the outer container as shown in FIG. 2, the upper edges of the inner container side walls, or more specifically, of the lips 56, are slightly above the outer container flanges 16 and shoulder 66. These lips 56 curve upwardly and inwardly from the upper edges of the side wall 52 and thus define an entry to the interior of the inner container. Being spaced above the outer container 10, the lip 56 also effectively blocks water flowing along the ground and over the flange 16 of the outer container from flowing into the inner container. However, a space is provided between the inner edge of shoulder 66 and the outer side of lip 56 to permit entry of water into the outer container.

In use, cover 22 is detached from the support ring 28. The inner container is inserted through the support ring 28 between the posts 24a–24f and into the outer container 10. A quantity of poison bait 60 is placed in the bottom of the inner container and the outer container is then partially buried in the ground with its flange 16 substantially at ground level. Cover 22 is then connected to support ring 28 and the trap is ready for operation. In normal use the pest will crawl through the entry aperture or apertures 40 formed in flange 46, over the outer container flange 16 and shoulder 66, over the entry defining lip 56 of the inner container and down into the bottom of the inner container where access to the poison bait is readily available. Should the pests thereafter attempt to leave the trap, the overhanging inwardly spaced configuration of the lip 56 and its edge 58 tend to block such exit.

Should the ground become flooded due to heavy rains or the flooding with a garden hose or garden sprinkler, water flowing along ground surface 20 will flow over the outer container flange 16. However, since lip 56 is higher than the flange 16 and further since the inner container is smaller than the outer container to provide a space between the two, water flowing over the flange 16 will flow through the annular conduit defined between the side walls of the inner container and the side walls of the outer container down to the bottom of the containers. Use of the guide bars 68a–68d permits this annular passage to be larger, to hold more water and to be less subject to obstruction from earth and debris. Although water will drain from the bottom of the outer container through holes 18 formed therein, the rate of this drainage may be less than the rate of flow of water into the outer container. Accordingly, water may collect within the outer container, rising in the outer container in the annular passage between the side walls of the two containers and filling the bottom of the outer container. Now the inner container, which is buoyant even with a quantity of poisoned bait and pests contained therein, will float upwardly within the outer container due to its loose fit therein, being guided in its vertical motion by the shoulder 66 and guide bars 68a–68d. The inner container continues to float upwardly as long as water continues to rise within the outer container until the lips 56 contact the under surface of the body 26 of cover 22, as illustrated in dotted lines in FIG. 2. The mutually contacting surfaces of the lip 56 and under surface of cover body 26 provide an effective water seal which prevents entry of water to the inner container even if the water level on the ground should rise above the top of the cover 22. Thus, it will be seen that water cannot enter the inner buoyant container and accordingly, poisoned bait therefrom cannot leave the buoyant container for distribution along the surface of the ground.

Cover 22 is impervious to air and, when submerged, will trap a body of air beneath the upper portion of its dome shape. Air will be trapped between the uppermost portion of the inner surface of the cover and an area just above the upper edges of pest entries 40. As soon as enough water enters the outer container to float the inner container upwardly to a point where the uppermost edges of lips 56 extend into the air pocket under the dome cover, the continuous circumferential container lip 56 will be entirely above the surface of the water below the air pocket and thus no water can enter the container even if the cover should be fully submerged.

When the water is no longer flooding the ground surface 20 and no further water is entering the outer container, drainage of water from the latter through apertures 18 will cause the water level within the outer container to lower until the inner buoyant container is once again resting upon the bottom of the outer container.

The detachable cover is readily removed and the inner buoyant container lifted from the outer container for disposal of the poisoned pests and replenishment of the bait. If deemed necessary or desirable, a disposable liner may be provided for the inner container so that the poisoned pests may be more readily handled by removing liner, bait and pests as a unitary package. The inner container is then refilled with additional bait and/or an additional disposable liner if desired. The inner container is once again inserted through the ring 28 into the outer container, the cover is reattached and the trap is again ready for operation.

Thus, it will be seen that the described pest trap provides an almost completely closed trap having a darkened interior that is attractive to pests and which will not only confine the poison bait but prevent its distribution under conditions of heavy flow of water in the vicinity of the buried trap.

The foregoing detailed description is to be clearly understood as given by way of illustration and example only, the spirit and scope of this invention being limited solely by the appended claims.

We claim:
1. A pest trap comprising
   an outer container,
   an inner buoyant container within said outer container, and
   means for providing a pest access path to the interior of said inner container.
2. The trap of claim 1 wherein said inner container is mounted within said outer container for vertical movement.
3. The trap of claim 2 wherein each said container includes upstanding side walls, wherein said outer container includes port means for permitting flow of water into said outer container, and wherein the upper edge of said side walls of said inner container extend to an elevation higher than said port means when said inner container is in a relatively lower position, whereby water flowing into said outer container via said port means will not flow into said inner container and the latter will float upon water contained in said outer container.

4. The trap of claim 3 wherein said outer container includes means for permitting drainage of water therefrom.

5. The trap of claim 4 including cover means for restricting entry of falling water into said containers.

6. The trap of claim 5 wherein said cover means comprises a rain shedding body, a plurality of supports mounting said body to and above said outer container, and a peripheral flange on said body extending downwards toward said outer container.

7. The trap of claim 4 wherein said port means comprises an upper portion of the side wall of said outer container and wherein said wall of said inner container includes a lip extending above said upper portion.

8. The trap of claim 7 wherein said lip comprises a surface inclined upwardly and inwardly from the upper portion of the side wall of said inner container.

9. The trap of claim 7 wherein said lip comprises a flange extending inwardly and downwardly from the upper portion of the side wall of said inner container.

10. A trap comprising
an outer cup apertured at a bottom portion thereof and having an upper edge, said cup adapted to be positioned at least partly below ground with said upper edge substantially at ground level,
an inner buoyant cup within said outer cup having a continuous upper edge positioned above said outer cup upper edge, a cover for said cups, and
means for supporting said cover above said cups.

11. The trap of claim 10 wherein said cups are relatively dimensioned to provide a space between the inside of said outer cup and the outside of said inner cup for reception of water flowing over the upper edge of said outer cup.

12. The trap of claim 10 including means for providing a liquid flow path from upper portions of said outer cup to the bottom of the interior of said outer cup.

13. The trap of claim 12 wherein said means for providing a liquid flow path comprises the outer surface of said inner cup and the inner surface of said outer cup.

14. The trap of claim 10 wherein said cover includes a peripheral flange extending downwardly to a level near the upper edge of said outer cup.

15. A pest trap comprising
a container having a bottom and upstanding side walls, said container adapted to contain pest bait,
means on upper edges of said side walls for defining an entry to the interior of said container, and
means responsive to water in said trap for blocking said entry to block flow of water into said container and to block movement of bait from said container.

16. The trap of claim 15 wherein said means for blocking said entry comprises an outer container circumscribing said first mentioned container and having side walls with upper edges positioned below said upper edges of said first mentioned container, and means for providing said first mentioned container with positive buoyancy within said outer container.

17. The trap of claim 16 including a cover mounted to and above said outer container, whereby said first mentioned container will float upon water in said outer container and the upper edges of the side walls of said first mentioned container will approach said cover to block said entry.

18. The trap of claim 17 wherein said cover is impervious to air and includes a downwardly extending peripheral portion for entrapping a pocket of air beneath the cover in the presence of water rising about the trap, said first mentioned container being positioned to float upwardly to project said upper edges thereof into a pocket of air entrapped beneath said cover.

* * * * *